Dec. 14, 1948. E. F. IWANSKI 2,456,062
THERMOMETER AND THERMOSTATICALLY OPERABLE
ELECTRIC SIGNALING DEVICE
Filed Oct. 8, 1945 2 Sheets-Sheet 1
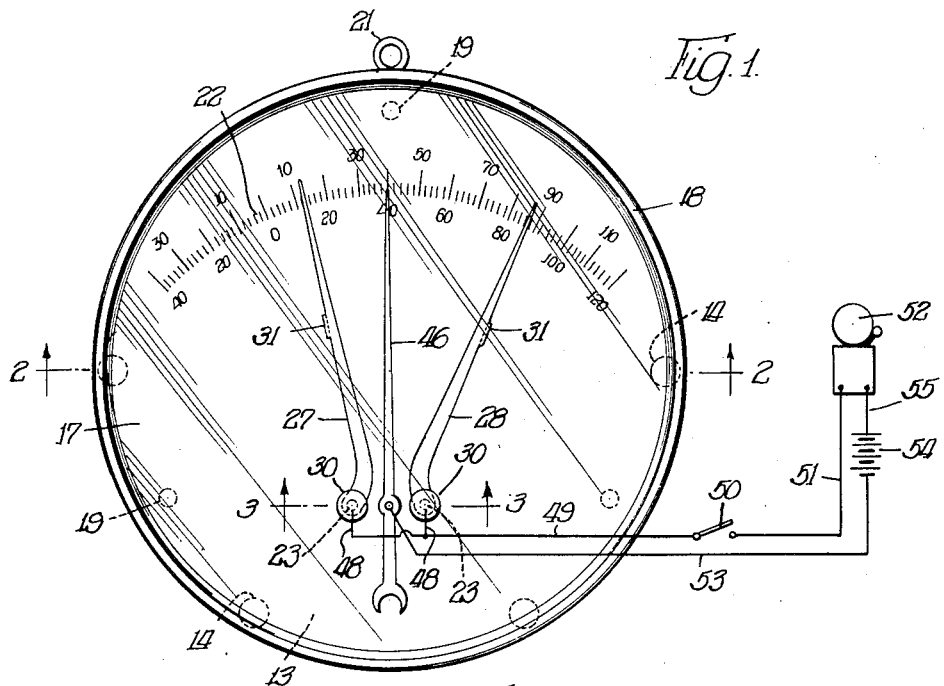
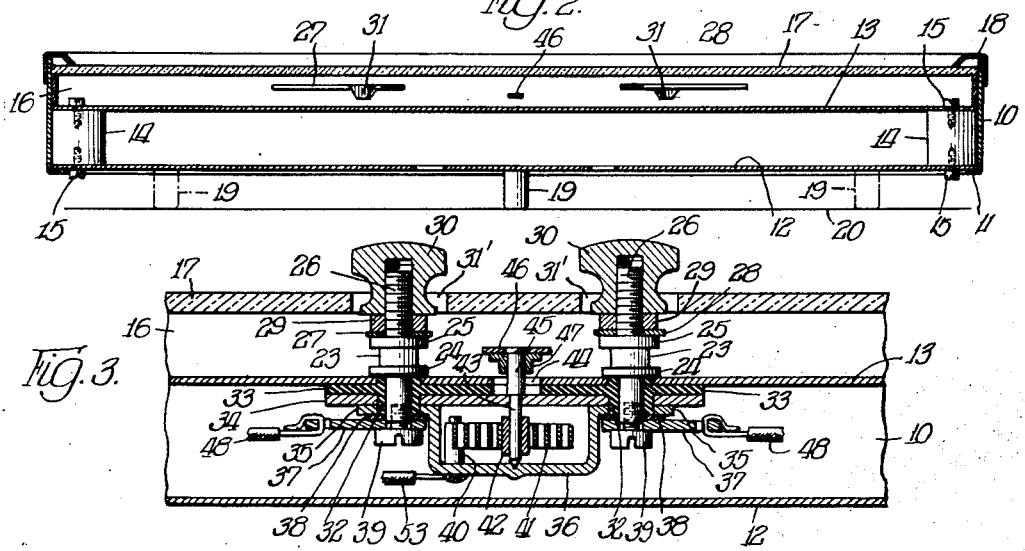
INVENTOR.
Emil F. Iwanski,

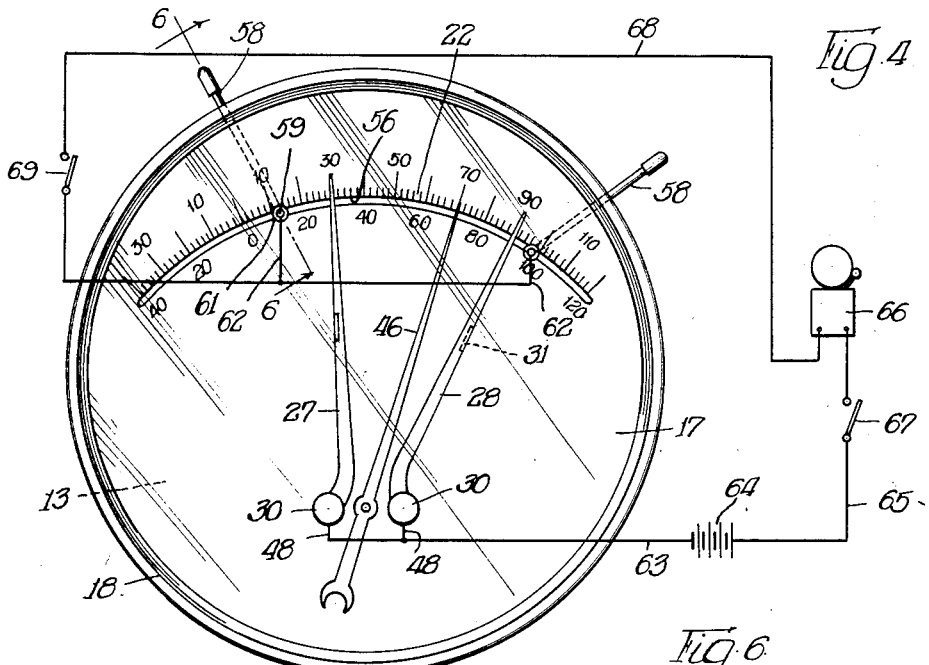
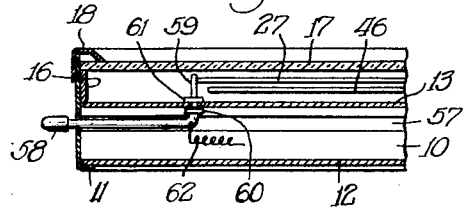
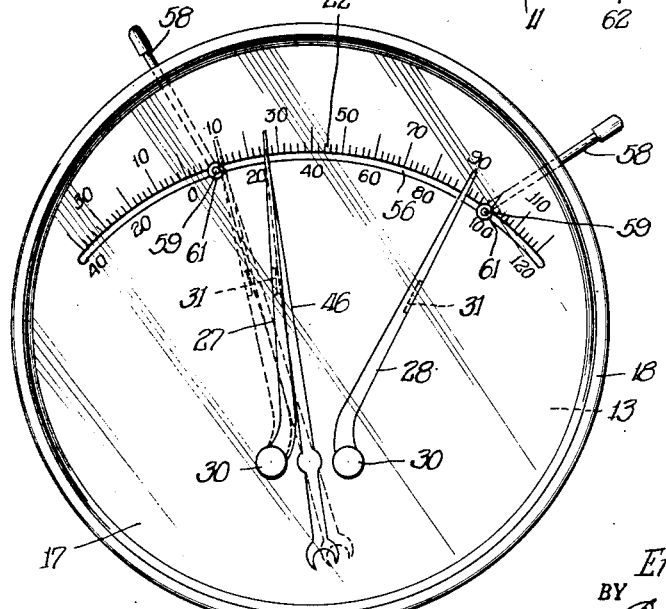

Patented Dec. 14, 1948

2,456,062

UNITED STATES PATENT OFFICE 2,456,062

THERMOMETER AND THERMOSTATICALLY OPERABLE ELECTRIC SIGNALING DEVICE

Emil F. Iwanski, Chicago, Ill.

Application October 8, 1945, Serial No. 620,906

3 Claims. (Cl. 177—311)

The present invention relates to thermostatic thermometers and has for its principal object the provision of electric signalling devices, thermostatically operable, for indicating that certain predetermined maximum temparture, either high or low, has been reached. Such thermometers may find their application in the orchards for warning an orchardist that a certain critical, low temperature has been reached, so that the orchardist may lay a smudge to protect his fruit from frost. The same may also be used in connection with incubators, fire alarms, etc., or for giving notice for correcting temperature in hospital or schoolrooms.

A still further object of the present invention is the provision, in a thermometer of the type above indicated, of adjustable markers for indicating therein a chosen, critical degree of temperature, either high or low, with signalling device operable instantaneously when that temperature has actually been reached.

Obviously, the temperature indicator, in its ascent or descent towards said adjustable markers, may stop short thereof without actuating the signalling device; or in fact, having stopped short thereof, it may reverse its course due to the change in the temperature. For the purpose of keeping records it may be advisable to know to what maximum, high or low, the temperature indicator has reached before it reversed its course, and without having actuated the signalling device. Therefore, another object of the present invention is the provision of a visual indicating means for showing the degree of temperature to which the temperature indicator has reached immediately prior to the reversal of its course and without reaching the temperature degree for which the signalling device was set to operate by being actuated by the temperature indicator.

With the above general objects in view and others that will appear as the invention is better understood, the same consists in the novel construction, combination and arrangement of parts hereinafter more fully described, illustrated in the accompanying drawings and pointed out in the appended claims.

In the drawings forming a part of this application and in which like designating characters refer to corresponding parts throughout the several views;

Fig. 1 is a face elevational view of a thermometer in accordance with the present invention, with a pair of hands, one for setting at low point, and the other at high point on the thermometer scale, with temperature indicator therebetween, with a diagrammatic showing of an electric circuit connecting said hands and said indicator, for operating a signal when the electric circuit is completed when said indicator comes in contact with one or the other of said hands;

Fig. 2 is an enlarged cross-sectional view on line 2—2 of Fig. 1;

Fig. 3 is an enlarged cross-sectional view on line 3—3 of Fig. 1, illustrating the thermostatic device for actuating the temperature indicator, with pivot posts for hands, and terminals for electric circuit wires;

Fig. 4 is a face elevational view of a thermometer of a modified construction and operation, adapted to indicate certain maximum temperature, either high or low, reached, but short of the degree at which the signal was set to operate, also diagrammatically illustrating an electric circuit to operate a signal when certain marked degree of temperature has been reached;

Fig. 5 is a similar view, with the electric circuit omitted illustrating a mode of operation of the thermometer; and Fig. 6 is a cross-sectional view on line 6—6 of Fig. 4.

Referring to the present drawings in detail there is shown an annular wall 10, provided at its lower end with horizontal, inwardly extending flange 11. The latter supports bottom 12. Face 13, disposed within said annular wall 10, is maintained in a spaced, rigid relation with bottom 12, by means of a plurality of cylindrical spacers 14, which are engaged by screws 15 passing through said bottom 12 and face 13.

Spaced from said face 13, by annular band 16, is glass plate 17, said band 16 snugly overlying the inner periphery of said annular wall 10. Flanged hoop 18, frictionally engaging the outer periphery of said annular wall 10, adjacent its upper end, and bearing against the peripheral margin of said glass plate 17, maintains the latter, face 13 and bottom 12 in a rigid relative position with said annular wall 10.

Bottom 12 has a plurality of lugs 19, for supporting the device horizontally upon any base 20. Said bottom 12 also carries eye 21, extending beyond the perimeter of wall 10, for supporting the device vertically.

Face 13, adjacent a portion of its periphery, has printed, engraved or otherwise indicated, thermometric scale 22, arranged in an arc. In the drawings the range in the thermometric scale 22 is from 40 degrees below zero to 120 degrees above zero. The range of course may be varied.

depending upon the particular purpose for which the thermometer may be used.

Cooperating with face 13 and extending therethrough is a pair of posts 23, each provided with an annular flange 24 intermediately its ends.

Integrally formed with each post 23, substantially centrally thereof, and in a spaced relation with said flange 24 is collar 25. The outer end of each post 23 is threaded as at 26. Post 23 which is in nearest proximity to the low end in the range of thermometric scale 22 carries hand 27 which is set by one of its ends over the threaded end of said post 23 and rests upon said collar 25. The other post 23, disposed nearest to the high end of the range of thermometric scale 22, carries in a like manner hand 28. Placed over each hand 27 and 28 is washer 29. Threadedly engaging the outer end of each post 23 is knob 30 which clamps hands 27 and 28 between their respective collars 25 and washers 29, for maintaining said hands 27 and 28 in a rigid engagement with their cooperating posts 23. Glass plate 17 is provided with two apertures 31' permitting the outer ends of posts 23 and knobs 30 to extend thereabove for manually grasping said knobs 30 and turning posts 23 for angularly shifting hands 27 and 28 for the purpose which will be later apparent. Said hands 27 and 28 remain however below said glass plate 17.

Said hands 27 and 28, on their edges which are farthest removed from each other, are each provided with an integrally formed and downwardly depending tongue 31 for the purpose hereinafter described.

Placed over the lower end of each post 23 is bushing 32 of non-conducting material, which by its upper end extends into the aperture in face 13 through which post 23 passes. Integrally formed with said bushing 32 and laterally projecting therefrom is an insulating plate 33. Metallic plate 34, in contact with insulating plate 33, clamps the latter to face 13. Flanges 35, integrally formed with U-shaped plate 36, are in contact with said metallic plate 34. Both said plate 34 and said flanges 35 are provided with suitable alined openings through which said bushings 32 extend.

The upper ends of bushings 32 may extend above the upper face of face plate 13 so that flanges 24 may directly rest thereon and thereby posts 23 may be insulated from face 13. If however face 13 is made of non-conducting material such as stiff cardboard or plastic, said flanges 24 may directly contact with said face 13 as shown in Fig. 3.

Placed over the lower end of each of said posts 23 is terminal plate 37, between each of which and each flange 35 insulating washer 38 is interposed. Screw heads 39, engaging the lower ends of posts 23 maintain said terminal plates 37 in position, said terminal plates 37 being provided with apertures through which the lower ends of posts 23 are adapted to pass.

Suitable independent means may be provided for binding plates 33 and 34, flanges 35, terminal plates 37 and washers 38 to face 13, although screw heads 39 alone are sufficient to accomplish that purpose.

Rigidly set within plate 36 is post 40 binding the outer end of coil spring 41 made of a thermostatic material. The inner end of said coil spring 41 made is affixed to collar 42, the latter frictionally set upon rocker shaft 43. Said rocker shaft 43 is fulcrumed by its lower end upon the horizontal portion of said U-shaped plate 36.

The upper end of said rocker shaft 43 extends through said plate 34 which laterally supports the same. The upper end of said rocker shaft 43 further extends through alined openings 44 made in face 13 and insulating plate 33, and receives in a frictional engagement cap 45, the latter being rigidly affixed to temperature indicator 46. Bushing 47 in frictional engagement with cap 45 provides an additional seat for temperature indicator 46.

Temperature indicator 46 is below the plane of hands 27 and 28, but in the path of tongues 31.

From the hereinabove description it will be apparent that hands 27 and 28, their respective posts 23 and terminal plates 37 are insulated from each other, as well as from temperature indicator 46 and its appurtenances, including plate 34, flanges 35, U-shaped plate 36, thermostatic coil 41, shaft 43 and cap 45.

All the parts hereinabove described are common to all forms of invention illustrated in Figs. 1 to 6, both inclusive.

Referring now more particularly to the form of invention illustrated in Figs. 1, 2 and 3, wire 48 connects with each terminal plate 37. Through posts 23 said wires 48 are in an indirect contact with the respective hands 27 and 28, as diagrammatically indicated in Fig. 1. By their opposite ends said wires 48 connect with main wire 49, the latter leading to switch 50. Wire 51 leads from said switch 50 to signal 52, which may be either audible or visual or both.

Connecting with U-shaped plate 36 is wire 53 leading to battery 54. In effect wire 53, through U-shaped plate 36, rocker shaft 43 and cap 45, connects with temperature indicator 46.

Wire 55, connecting battery 54 and signal 52, completes the parts necessary for the electric circuit illustrated in Fig. 1.

As to the operation of the form of invention shown in Figs 1, 2 and 3, if we assume that switch 50 is closed, as normally it should be, and if for example we assume further that 13 degrees above zero is the critical temperature, at the time of which when reached it is desired to sound a signal, hand 27 is angularly shifted by turning knob 30 in order to bring said hand to point to 13 degrees above zero, in the thermometric scale 22, which is the position of hand 27 shown in Fig. 1. If temperature of 13 degrees above zero is actually reached, temperature indicator 46 actuated by thermostatic coil 41, will be shifted to coincide with the set position of hand 27. When the positions of hand 27 and of temperature indicator 46 become coincidental, that is when the two come into a vertical alinement temperature indicator 46 will come in contact with tongue 31 carried by said hand 27 and thereby the electric circuit will be completed to energize signal 52 as is obvious.

It is observed that when switch 50 remains closed and when temperature indicator 46 comes in contact with either of the two tongues 31, on hands 27 or 28, the electric circuit in either event will be completed through one or the other of the two wires 48 to energize signal 52 and set the same in operation.

There is another mode of operation of the invention illustrated in Figs. 1, 2 and 3. For example, in the evening of a certain day the temperature is 40 degrees above zero, the position of temperature indicator 46, as shown in Fig. 1, but it is expected that during the night to follow the temperature will drop, and it is desirable to ascertain what was the minimum temperature reached during that night without actually constantly watching the thermometer. For that given example, switch 50 is first disconnected, because in the given example the requirement did not call for sounding of signal 52. Then hand 27 is manually shifted toward temperature indicator 46, until they coincide, that is, when both point to 40 degrees above zero on thermometric scale 22. In that position tongue 31 of hand 27 will contact with temperature indicator 46. Suppose the following morning it was found that the position of hand 27 and of temperature indicator 46 is identical with that shown in Fig. 1. The only conclusion to be reached, particularly from the ultimate found position of hand 27, is that temperature indicator 46, during the preceding night, by the force of its thermostatic coil 41, when under contraction due to decreasing temperature, shifted with it hand 27 to point at 13 above zero, thereby indicating that that was the minimum temperature reached during the preceding night. From the found position of temperature indicator 46, pointing to 40 degrees above zero, in the given example, as shown in Fig. 1, it is concluded that having shifted hand 27 to the point of minimum temperature reached during the preceding night, it has since returned to indicate the actual temperature at the moment of reading.

It is noted that in the first example the function of tongue 31 was to close the electric circuit through hand 27 and temperature indicator 46, whereas in the second example the function of tongue 31 was purely mechanical, namely it acted as means for shifting hand 27 when under actuation of temperature indicator 46.

To give a further, third, example of the operation of the thermometer, let us suppose that at a given moment temperature indicator 46 points to 40 degrees as in Fig. 1, but from that point it is uncertain as to whether temperature will rise or descend, and it is desirable to ascertain what was either the maximum or minimum temperature reached within any succeeding period of time. To condition the device, in the example given, both hands 27 and 28 are manually shifted towards temperature indicator 46 and as near to it as said hands will go. Suppose at the time of reading hand 27 was found to be at its original position, substantially at 40 degrees above zero, indicating that temperature indicator 46 did not go below 40 degrees above zero, but hand 28 was found at 88 degrees above zero, position of said hand shown in Fig. 1. That position of hand 28 would indicate that temperature indicator 46 carried it there, thereby indicating that at some particular moment prior to the final reading that was the maximum temperature reached.

From the three given examples it will be apparent that the invention is susceptible of wide latitude of use. Where signal is employed in connection with the thermometer, the same may be used for orchards, incubators and such other uses where immediate action is required when a predetermined set temperature is reached by the thermometer, as indicated by the first example aforesaid.

Where the thermometer is employed without the signal, the same may be used by the weather bureaus for recording periodic maximum or minimum temperature changes. Another suggested use is in connection with industrial processes, for recording temperature changes, and wherein no immediate action is called for when a certain temperature, either high or low, has been reached.

There is no provision in the form of the invention illustrated in Fig. 1 to record the maximum or minimum temperature to which temperature indicator 46 has shifted, but short of the point of temperature for which the signal was set to operate. This situation substantially partakes of a combined function of the thermometer stated in the first and second examples aforesaid. To give an example, suppose the critical degree for which the signal is set to operate is 10 degrees above zero, and suppose temperature indicator 46, while shifting in the direction of the lower end of the thermometric scale 22, has not reached 10 degrees above zero, but stops short thereof, for instance at 28 degrees above zero, and from that latter point reverses its shifting course into the opposite direction, that is, towards the higher end of the thermometric scale 22 without ever reaching 10 degrees above zero. Oftentimes it might be desirable to know just what was the highest or lowest point reached in the temperature in its ascent or descent (in the example given 28 degrees above zero) towards the point on the thermometric scale at which the signal was set to operate (10 degrees above zero in the example given). The form of the invention illustrated in Fig. 1 is incapable of solving the problem posed by the last given example. Hence the modification illustrated in Figs. 4, 5 and 6.

Referring now to Figs. 4, 5 and 6 it is noted that temperature indicator 46 is not in the electric circuit. Therefore wire 53 of Figs. 1 and 3 is eliminated from Figs. 4, 5 and 6. Furthermore, face 13 is provided with arcuate slot 56, made along and coextensively with thermometric scale 22.

Opposite thermometric scale 22, annular wall 10 is provided with longitudinal recess 57 through which a pair of handles 58 enters the casing defined by said annular wall 10. One of said handles 58 cooperates with the low end of thermometric scale 22, while the other thereof with the high end of scale 22. Each of said handles 58 projects outwardly of said annular wall 10 for manual operation. Each of said handles 58 has a vertically and upwardly disposed extension 59, which preferably may be disengageably connected with handle 58. The inner end of each handle 58 is provided with flange 60, and said extension 59 is provided with a similar flange 61. Said extension 59 enters said slot 56 and projects above face 13, the free upper end of said extension 59 being disposed above the horizontal plane in which said hands 27 and 28 shift, so that each of said extensions 59 is in the path of movement of said hands 27 and 28, as seen in Fig. 6. The two flanges 60 and 61 frictionally engage face 13 at its marginal portions adjacent slot 56, but permit shifting of extensions 59 along the path of slot 56 when handles 58 are manually actuated.

Handles 58 are suitably insulated from annular wall 10. Said handles 58 and extensions 59 are also insulated from face 13, unless the latter is of a non-conducting material.

Wire 62 connects with each handle 58 and through it, with extension 59.

In addition to wires 48 and 62, the electric circuit, traced in Fig. 4, includes wire 63, to which each wire 48 connects. Wire 63 connects with battery 64. Wire 65, connecting battery 64 with signal 66, is broken by switch 67. Each wire 62 connects with wire 68, the latter leading to signal 66. Said wire 68 is provided with an auxiliary switch 69.

It is obvious that if hand 27 is in contact with extension 59 at the lower end of scale 22 the electric circuit will be completed to energize signal 66, assuming of course that both switches 67 and 69 are closed. Likewise, if hand 28 is in contact with extension 59 at the higher end of scale 22, the electric circuit will also be completed to energize signal 66, when said switches 67 and 69 remain closed.

As to the operation of the form of invention illustrated in Figs. 4, 5 and 6, and further elucidating on the fourth example aforesaid, if prior to conditioning the thermometer to give signal when temperature reaches 10 degrees above zero, it is found that temperature indicator 46 rests at 70 degrees above zero as shown in Fig. 4, the following procedure is resorted to: first, extension 59 at the lower end of scale 22 is shifted to rest at 10 degrees above zero, position shown in Figs. 4 and 5, and second, hand 27 is shifted toward temperature indicator 46, that is to the point of 70 degrees above zero, so as to bring tongue 31 in hand 27 in contact therewith. If from that point the temperature drops, temperature indicator 46 will shift in the direction of the lower end of scale 22, carrying with it hand 27 due to engagement of the latter with the former by virtue of the connection therewith through tongue 31. If the temperature reaches 10 degrees above zero, temperature indicator 46 will shift to the point of 10 degrees above zero, shifting with it hand 27 and as soon as at that point the latter comes in contact with the adjacent extension 59 previously set at that point, position shown by dotted lines in Fig. 5, the electric circuit aforesaid will be completed because the gap therein between wire 48 at hand 27 and wire 62 will have been bridged by hand 27 and extension 59, always assuming that switches 67 and 69 remain closed. The closing of the electric circuit immediately hereinabove described will energize signal 66 setting in in operation.

But let us assume that temperature has not reached 10 degrees above zero to operate signal 66, but has reached the maximum low of only 26 degrees above zero. In that case, at the particular reading it will be found that hand 27 rests at the point of 26 degrees above zero, position of hand 27 indicated by full lines in Fig. 5, with temperature indicator 46 either at the same point or removed toward the higher end of scale 22, depending on what was the particular degree of temperature at the time of reading. Thus, in the last assumed case, the observer would be appraised that in the interval between setting the thermometer and reading in the maximum low temperature reach was 26 degrees above zero, and which was not sufficient to set signal 66 in operation, which was set to operate at 10 degrees above zero. The observer may use the fact thus acquired either for prognostication, statistics or merely record.

Situations may occur where both extensions 59 at both ends of scale 22 may be simultaneously set to condition signal 66 to operate whenever certain low or certain high temperature is reached.

If the thermometer of the form shown in Figs. 4, 5 and 6 is used in connection with an orchard, signal 66 and switch 67 would preferably remain within an orchardist's abode, with the thermometer itself and auxiliary switch 69 in the orchard. The object of said auxiliary switch is for the purpose of testing the electric circuit during the repairs or adjustments of the thermometer without resorting to switch 67 which may be at a considerable distance from the thermometer itself. It is therefore contemplated to have said auxiliary switch in the near proximity of the thermometer.

It is further noted the frictional contact between posts 23 and bushings 32, or between terminal plates 37 and screw heads 39, need not be so strong as to be incapable to be overcome by either manual shifting of hands 27 and 28 or when actuated by temperature indicator 46. Since knobs 30 are in a very tight engagement with the threaded ends 26 and washers 29, their engagement therewith will not be affected by the manual shifting of hands 27 and 28 through said knobs 30.

No serious disarrangement of parts supported by screw heads 39 need be feared when posts 23 are turned, since at no time need they make a complete revolution.

It is understood that the thermometer herein disclosed may have a multitude of other uses than those herein mentioned. Also the particular practical adaptations of the invention cited, or functions or functional situations mentioned were merely a few examples thereof for better understanding of the construction and operation of the invention.

While there is described herein preferred embodiments of the present invention, it is nevertheless to be understood that minor changes may be made therein without departing from the spirit and scope of the invention as claimed.

What I claim as new is:

1. A thermostatically operable thermometer comprising a dial having a thermometric scale depicted thereon and a temperature indicator disposed above said dial, said dial being provided with a slot coextensive with said thermometric scale, a marker shiftable within said slot for selectively marking temperature degrees upon said thermometric scale, a hand in pivotal engagement with said dial and movable over said thermometric scale, said hand being positioned intermediate said temperature indicator and said marker, an electric signal, a series electric circuit including said signal, said marker and said hand, whereby temperature changes moving said temperature indicator toward said hand will engage said hand and shift said hand therewith towards said marker, said hand upon contacting said marker completing said electric circuit to energize said signal and to set the same in operation, said temperature indicator being movable away from said hand without deenergizing said signal.

2. A thermostatically operable thermometer comprising a dial having a thermometric scale depicted thereon and a temperature indicator disposed above said dial, said dial being provided with a slot coextensive with said thermometric scale, a plurality of markers shiftable within said slot for selectively marking temperature degrees upon said thermometric scale, a plurality of hands pivotally mounted on said dial, at least one of said hands being positioned intermediate said temperature indicator and at least one of said markers, said hands being movable over said thermometric scale, an electric signal, a series electric circuit including said signal, said marker and said hand, whereby temperature changes moving said temperature indicator toward at least one of said hands will engage said one hand and shift said one hand therewith towards at least one of said markers, said one hand upon contacting said marker completing said electric circuit to energize said signal and to set the same in operation, said temperature indicator being movable away from said one hand without deenergizing said signal.

3. A thermostatically operable thermometer comprising a dial having a thermometric scale depicted thereon and a temperature indicator disposed above said dial, said dial being provided with a slot coextensive with said thermometric scale, a pair of markers shiftable within said slot for selectively marking temperature degrees upon said thermometric scale, a pair of hands pivotally mounted on said dial, each of said hands being disposed intermediate said temperature indicator and each of said markers, said hands being movable over said thermometric scale, an electric signal, a series electric circuit, said signal, said markers and said hands being connected in said series circuit, whereby temperature changes will move said temperature indicator toward one of said hands and upon engagement therewith will shift said hand toward its adjacent marker, said hand upon contacting said marker completing said electric circuit to energize said signal and to set the same in operation, said temperature indicator being movable away from said hand without deenergizing said signal.

EMIL F. IWANSKI.

REFERENCES CITED

The following references are of record in the file of this patent:

UNITED STATES PATENTS

| Number | Name | Date |
|---|---|---|
| 347,571 | Clarke | Aug. 17, 1886 |
| 1,136,407 | Carrigan | Apr. 20, 1915 |
| 1,824,933 | Scholty | Sept. 29, 1931 |
| 2,110,391 | Davis | Mar. 8, 1938 |
| 2,230,678 | Bruce | Feb. 4, 1941 |